United States Patent [19]

Jandrell

[11] 4,442,317

[45] Apr. 10, 1984

[54] COORDINATE SENSING DEVICE

[75] Inventor: Louis H. M. Jandrell, Terra Linda, Calif.

[73] Assignee: Sun-Flex Company, Inc., Novato, Calif.

[21] Appl. No.: 300,687

[22] Filed: Sep. 14, 1981

[51] Int. Cl.³ .............................................. G08C 21/00
[52] U.S. Cl. ..................................... 178/18; 428/255; 340/712; 340/709; 358/83
[58] Field of Search ......................... 178/18; 428/255; 340/712, 365 UL, 709; 358/83, 93

[56] References Cited

U.S. PATENT DOCUMENTS

| | | | |
|---|---|---|---|
| 3,449,516 | 6/1969 | Cameron et al. | 178/18 |
| 3,632,874 | 1/1972 | Malavard et al. | 178/18 |
| 3,699,439 | 10/1972 | Turner | 324/71 R |
| 3,798,370 | 3/1974 | Hurst | 178/18 |
| 3,911,215 | 10/1975 | Hurst et al. | 178/18 |
| 3,916,099 | 10/1975 | Hlady | 178/18 |
| 4,012,588 | 3/1977 | Daviš et al. | 178/18 |
| 4,018,989 | 4/1977 | Snyder et al. | 178/18 |
| 4,055,726 | 10/1977 | Turner et al. | 178/18 |
| 4,070,544 | 1/1978 | Lambden | 178/18 |
| 4,071,689 | 1/1978 | Talmage et al. | 178/18 |
| 4,071,691 | 1/1978 | Pepper, Jr. | 178/19 |
| 4,079,194 | 3/1978 | Kley | 178/18 |
| 4,080,514 | 3/1978 | Pobgree | 178/18 |
| 4,080,515 | 3/1978 | Anderson | 178/19 |
| 4,149,029 | 4/1979 | Pobgee | 178/18 |
| 4,164,622 | 8/1979 | Pobgee | 178/18 |
| 4,177,354 | 12/1979 | Mathews | 178/18 |
| 4,178,481 | 12/1979 | Kley | 178/18 |
| 4,198,539 | 4/1980 | Pepper, Jr. | 178/18 |
| 4,207,444 | 6/1980 | Kley | 200/5 A |
| 4,214,122 | 7/1980 | Kley | 178/18 |
| 4,220,815 | 9/1980 | Gibson et al. | 178/18 |
| 4,253,737 | 3/1981 | Thomsen et al. | 350/276 R |

FOREIGN PATENT DOCUMENTS

| | | | |
|---|---|---|---|
| 2110110 | 9/1971 | Fed. Rep. of Germany | 178/18 |
| 1331942 | 9/1973 | United Kingdom | 178/18 |
| 1560791 | 2/1980 | United Kingdom | 178/18 |

OTHER PUBLICATIONS

Elographics, Inc., letter, specification sheet E270, E271, and price list Apr. 1981.

*Primary Examiner*—Stafford D. Schreyer
*Attorney, Agent, or Firm*—Phillips, Moore, Lempio & Finley

[57] ABSTRACT

A coordinate sensing device uses electric currents to energize a conducting member which has a major surface and preferably is made of mesh material. Electrical currents are sequentially applied to create alternate noncoincident electrical fields so that when a probe is applied to the surface, the obtained electrical potentials can be compared to a reference potential. The resulting potential differences may then be conveniently converted to appropriate signals. The conducting member is not limited as to shape or construction; hence, it may also act as an anti-glare device for a cathode-ray tube. The fields created by the electrical currents need not be uniform.

22 Claims, 6 Drawing Figures

COORDINATE SENSING DEVICE

TECHNICAL FIELD

This invention relates to the determination of a position on a surface. In particular, it relates to determining Cartesian coordinates in two dimensions on a surface which may or may not be a plane and which need not be rectangular.

BACKGROUND ART

Soon after computers first became widespread, attempts were made to communicate with the computer by means of a display device. Initial efforts generally involved the use of a keyboard terminal and a cathode-ray tube (CRT) capable of depicting alpha-numeric characters based on input of the keyboard or output from the computer. Soon thereafter, the cathode-ray tube became an interactive unit itself wherein the computer operator could select, by means of a ligh-sensitive probe or a touch-sensitive surface, various options displayed by the cathode-ray tube. Almost concurrently, the engineering profession developed design programs wherein machinery design and the like could be accomplished by means of a light pen passing over the face of a cathode-ray tube so that the path followed by the light pen became the design for the machinery.

When using CRT's for selectively choosing a particular alternative presented on the surface of the visual display device, the selection processes may be in the form of a menu, that is, a lising of alternatives, or a tree structure. The menu or tree structure may be continued through three or four different displays in more complex problems. Alternatively, a diagram may be displayed on the CRT which prompts responses from the user. The purpose of these interactive terminals using either a light pen or a touch-sensitive device is to avoid the use of a keyboard-type terminal. Further, such devices take advantage of man's instinct to select by pointing. Present-day touch-sensitive devices pick up the coordinates of the selected point on the touch sensitive surface and transmit the coordinates to the machine for further manipulation. One drawback with the present machines utilizing the touch-sensitive input is the sensitivity of the surface material, thus necessitating a good deal of care on the part of the operator. This, of course, inhibits widespread use of such terminals due to the inherent problem of damage that may occur to the surface. A further inhibition to widespread use of a touch-sensitive terminal has been the inordinate cost in comparison with keyboard devices. Thus, high cost prohibits widespread usage, while sensitivity requires a good deal of training to learn to use the device to its fullest advantage without damaging the device. An example can be found in a design situation where each engineer may have one or two drawing boards which are available to him on a full-time basis, while the entire engineering design facility may have only one or two terminals to be utilized by the engineers in the more complex design situations.

In addition to the above drawbacks, the touch-sensitive surfaces have degraded the image on the display device by reducing light transmission to an unacceptable level, creating a glare on the surface, or degrading contrast. Furthermore, existing touch-sensitive devices have generally required a rectangular sheet of relatively rigid uniformly conductive material in order to use Cartesian coordinates. Since most video display devices are non-rectangular, the useful screen area may be reduced by an amount necessary to accommodate the touch-sensitive device. Finally, the typical display device does not exhibit a non-deformed image; thus the coordinate obtained on the screen does not necessarily correspond to the actual coordinates of a traced image.

In a more mundane environment where a menu is selected, it is envisioned that cheap interactive terminals could be used in the airline reservation business. For example, each ticket agent and each check-in clerk associated with a particular flight would be provided with a graphic display device on which a diagram of the plane and all its seats would be displayed. The agent or check-in clerk could then select the appropriate seat for the passenger without the necessity of "keyboarding" of the seat number and other information that might be required of the various reservation systems. Such a system has not been available in the past by the high cost of interactive video display terminals, not to mention the training required to use such terminals.

DISCLOSURE OF THE INVENTION

The present invention is directed to overcoming one or more of the problems as set forth above.

In one aspect of this invention, a coordinate sensing device includes an electrical conducting member defining a major surface. A constant current is selectively applied between a first injection point and a first sink point on the major surface, the first injection and sink points defining a first electric field across the major surface. A second current is selectively applied between a second injection point and a second sink point on the major surface, the second injection and sink points defining a second electrical field across the major surface. The two electrical fields are related so that the position of the equipotential lines from each field intersect at unique points. A probe is provided to selectively sense a first electrical potential on the first equipotential field at a physical point on the surface and a second electrical potential on the second equipotential field at the same physical point. Finally, the sensed first and second potentials are converted to an intelligent signal representing the coordinates of the physical point indicated in any chosen coordinate system.

The coordinate sensing device disclosed herein solves the major problem of graphic display devices in that simple circuitry, low-cost screen, and ease of calibration make available interactive graphic display devices to a much broader spectrum of users. Further, since the device need not be a solid, it permits the conducting surface to act as an anti-glare device.

BEST MODE OF CARRYING OUT THE INVENTION

Figure 1:
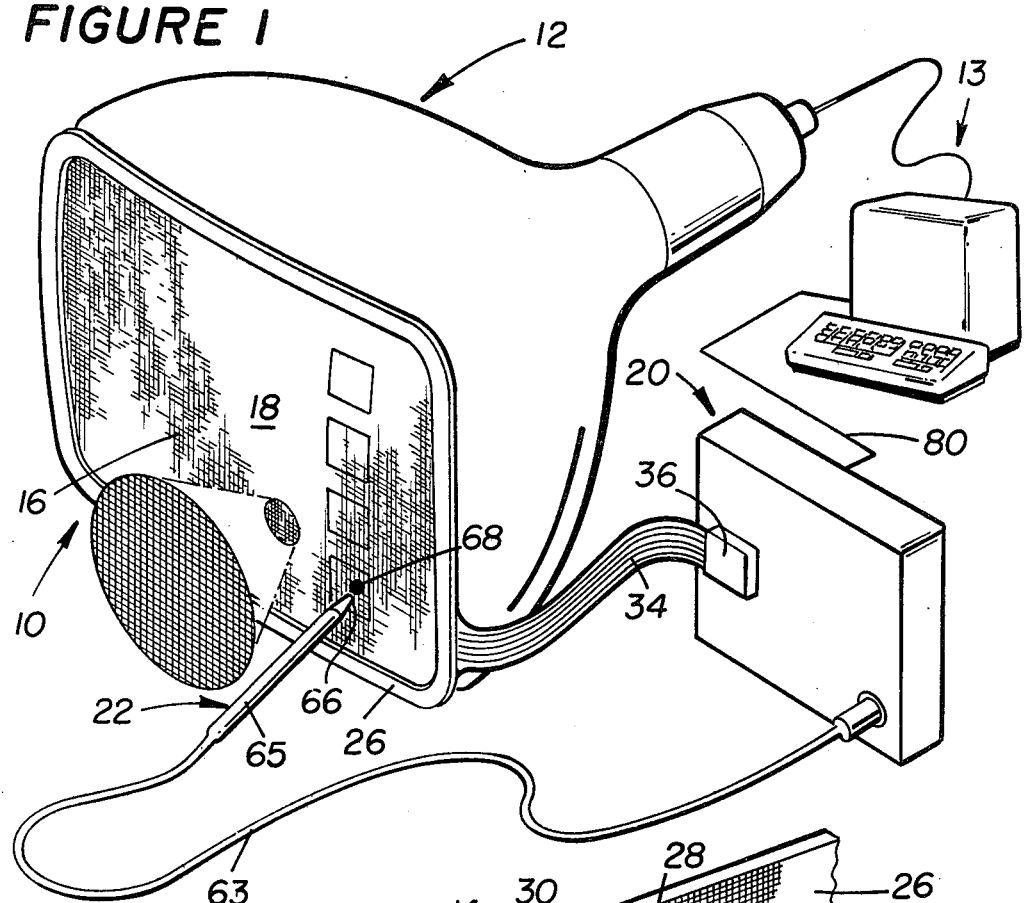
FIG. 1 is a perspective embodiment partially schematic of the coordinate sensing device disclosed herein in combination with a cathode-ray tube and a computer.
Figure 2:
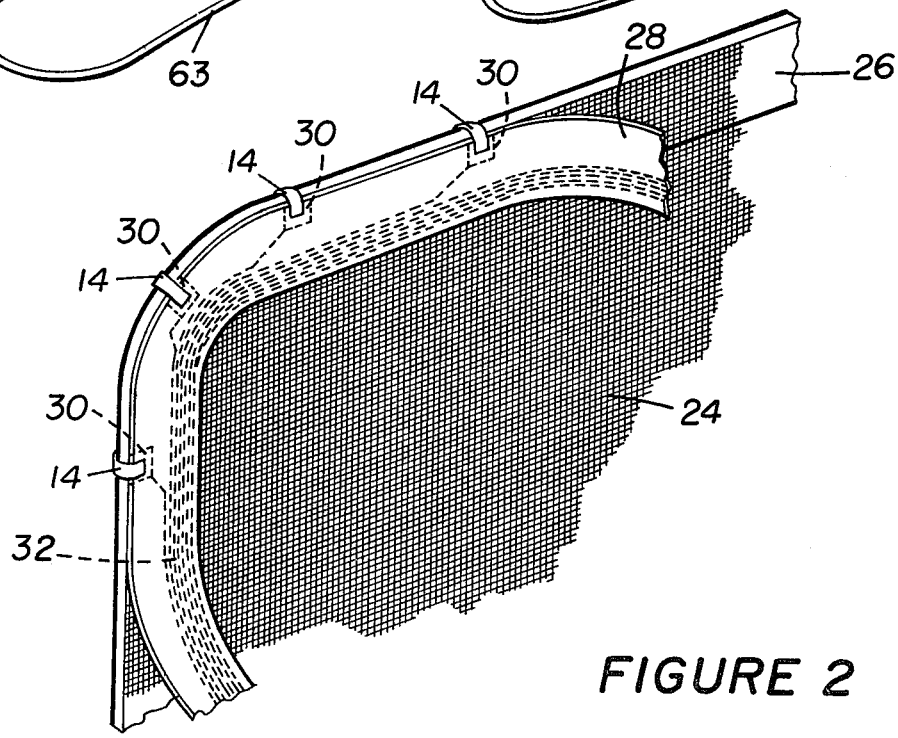
FIG. 2 is the mechanical structure associating the electrical conducting member to a framework.

Referring now to FIG. 1, a coordinate sensing device 10 is shown in conjunction with a cathode-ray tube 12 which may be driven by a conventional digital computer 13. It should be understood at the outset that the coordinate sensing device is not dependent upon a digital computer 13, but rather may be used in other environments wherein some visual display device similar to a cathode-ray tube, for example, a gas plasma display or rear projection, is used. Furthermore, the coordinate sensing device 10 may be associated with a permanent surface (not shown) wherein a series of alternative choices may be presented to an operator. For example, the coordinate sensing device 10 may be used with a fixed diagram such as a seating plan for a theater or an airplane, or alternatively, a room selection diagram for a hotel.

Coordinate sensing device 10 consists of an electrical conducting member 16 defining a major surface 18. Control means 20 are provided to establish electrical currents on two different axes of the electrical conducting member 16 at mutually exlcusive times. Probe means 22 are also provided to selectively sense a first and second electrical potential at a point on the major surface 18 of the electrial conducting member, the electrical potential based on the aforedescribed electrical currents established across the major surface. The sensed electrical potentials may then be converted into an intelligent signal. Having generally described the coordinate sensing system, each of the particular elements will be hereafter described in greater detail.

The electrical conducting member 18, in the preferred embodiment consists of a fine mesh screen 24. The mesh is greatly exaggerated in the drawings primarily for clarity's sake. This particular structure is advantageous when used with a cathode-ray tube such as cathode-ray tube 12 since the fine mesh screen may be colored with an anti-reflective color such as dark gray or black in the manner of the anti-glare device for a computer terminal display tube as disclosed in U.S. Pat. No. 4,253,737 issued on March 3, 1981 to Eric J. Thompson and Patrick W. Brennan and assigned to the assignee of this invention. Such an anti-glare screen enhances the contrast on the screen of the display tube. The fine mesh screen 24 in this invention is preferably made of woven nylon fibers with a smooth coaxial conductive plastic coating. Conductivity of the mesh is not critical. The preferred overall diameter of the fibers is in the range of 0.001 inches (0.00254 cm.) to 0.003 inches (0.00762 cm.). The mesh is preferably woven in a normal square weave, although other weaves are usable. The thread count may vary from 75 to 300 fibers per inch, depending on the light transmission characteristics of the required mesh. As previously noted, the mesh is preferably made substantially non-reflective by dyeing the fibers black in order to improve visual and optical appearance of the finished mesh.

The mesh 24 is bonded to a frame 26 which not only serves to keep the mesh 24 under proper tension, but further serves to carry the wiring assembly 28 and connecting pads 30. The frame may be molded or cut from any suitable material, such as plastic or the like. The wiring assembly 28 is preferably a flexible printed wiring assembly placed in contact with the mesh so that the connecting pads 30 are in correct positions about the frame. These positions are determined in such a way as to create an electric field across the mesh when a suitable constant current is injected at an injection point (or removed) at a sink point along opposite sides of the mesh. A constant current is preferred to overcome the variability in contact potential between pads 30 and mesh 24.

Figure 3:
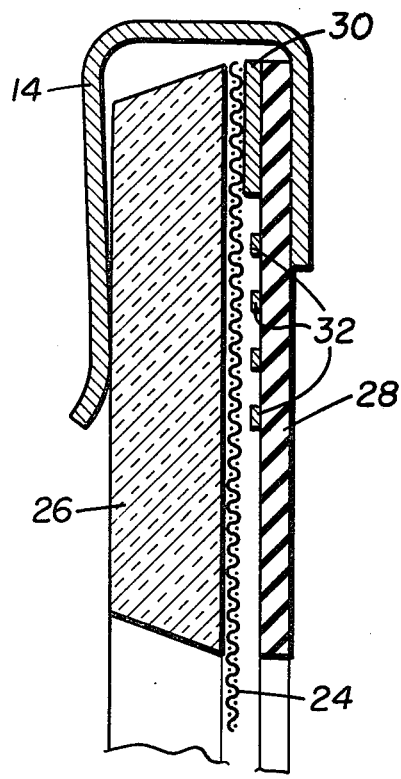
FIG. 3 is a detailed view in cross-section of the frame shown in FIG. 2.

Referring now to FIG. 3, which shows a cross-sectional view taken at one of the connecting pads 30, it can be seen that the mesh 24 is bonded to the frame 26 while the connecting pad 30 is in contact with the conductive surface of the mesh. Contact is maintained between the connecting pad 30, to which a single conductor 32 is affixed, and the mesh 24. This contact is maintained by a spring steel clip 14. The various conductors 32, which are affixed to the frame, are cojoined and led out from the frame 26 through a multi-conductor 34 leading to a plug 36.

It is appropriate to utilize some material to prevent degredation of the metal-plastic connection between connecting pad 30 and the mesh 24. A material such as gold, silicon grease, or the like may serve this purpose. The wiring assembly 28 may be silk-screened with an insulating material to prevent contact with the mesh by the individual conductors 32 leading to other contact pads. The strong steel spring 14 is sufficient to compensate for creep in the materials.

Figure 5:
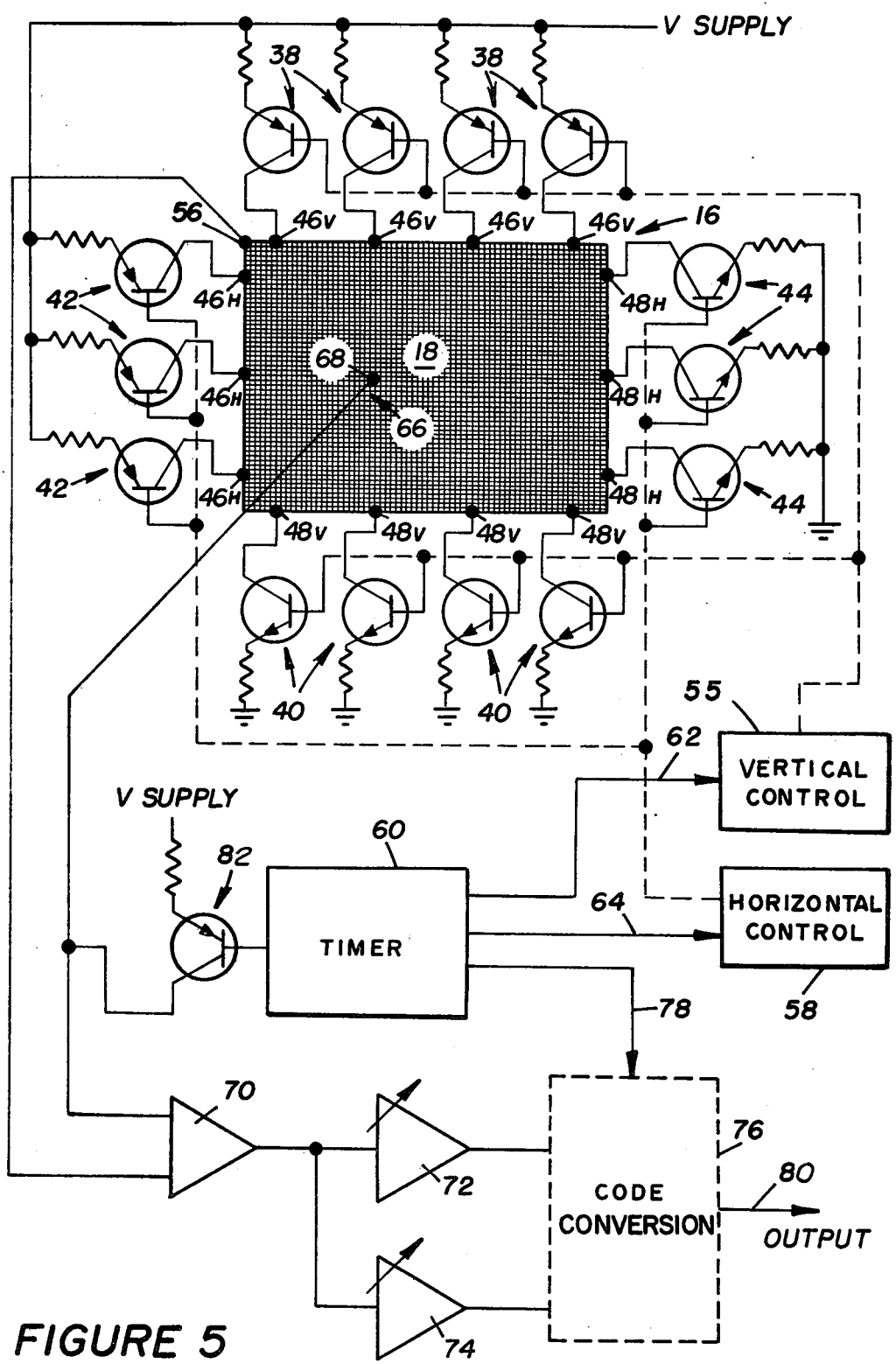
FIG. 5 is a schematic of the circuitry necessary to energize and operate the disclosed device.

Referring now to FIG. 5, a block diagram of a representative circuit to energize the coordinate sensing system is depicted. A plurality of current sources 38 and corresponding current sinks 40 are used to energize the conducting member 16 in a generally vertical direction, thereby establishing a first electric field. Similarly, a plurality of current sources 42 and corresponding current sinks 44 energize the conducting member 16 in a generally horizontal direction. In particular, a current is applied at an injection point 46v on one side of conducting member 16 and withdrawn or removed at a sink point 48v on the opposite side of the conducting member in order to establish an electrical current in a generally vertical direction across the major surface. Similarly, the current is injected at points 46h and withdrawn at 48h to establish a current in a generally horizontal direction across the major surface 18.

In one embodiment, it may be useful to position the injection and sink points as set forth below; however, the principles outlined below are generally applicable to establish essentially uniform electric fields across the surface.

Figure 4:
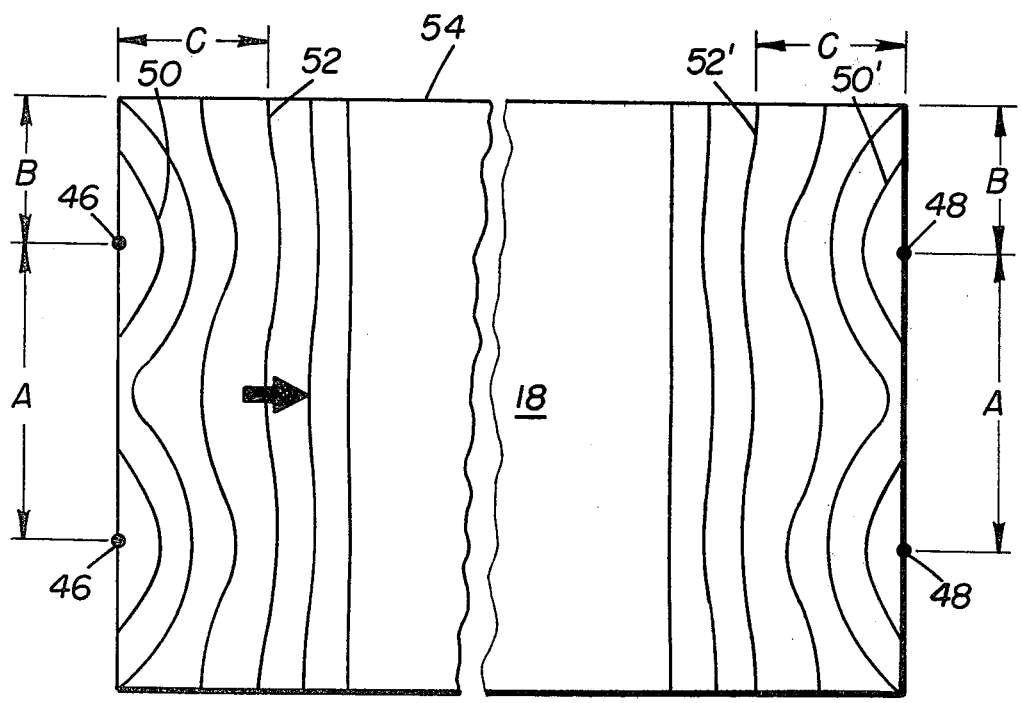
FIG. 4 is a diagram of the electrical field generated adjacent the connections depicted in FIG. 3.

Referring now to FIG. 4, a portion of a rectangular major surface 18 is shown schematttically with two injection points 46 and two sink points 48 depicted thereon. With the injection of a current at a points 46, a set of curved equipotential lines 50 and 52 are established around the points. If several points are utilized as shown in FIG. 5 and represented in FIG. 4 by the two points 46, the equipotential lines 50 and 52 become progressively straighter so that within a distance "C" approximately equal to one-half the separation distance "A" between the two injection points, the equipotential line approximates a straight line 52 as the current travels across the major surface 18 in the direction indicated by the arrow in FIG. 4. Approaching the current sink points 48, which are placed in substantially the same relationship as the injection points, the equipotential lines will again take on the curved form 50' as the current is withdrawn from the major surface 18. Thus, in order to achieve relatively straight eqipotential lines across the center of the major surface 18, the injection points 46 (either for the horizontal or vertical axes) should be located such that the first injection point from the edge 54 is spaced therefrom by a distance "B" generally equal to one-half the separation "A" between the adjacent injection points.

Similarly, the sink points should be likewise spaced. Using this relationship, the working area of major surface 18 is reduced by an amount equal to "C" along each edge where "C" is equal to one-half "A" and where "C" is also equal to "B." While not shown, the injection and sink points on the top and bottom edge of the screen shown in FIG. 4 would then be spaced a distance D=2C. It should be noted that when the edges of major surface 18 are curved to fit the front face of a cathode-ray tube as shown in FIG. 1, minor positioning adjustments or minor current adjustments may be necessary to compensate in part for the curved current flow lines.

A reference point 56 (see FIG. 5) is located on the electrical conducting member 16 at some convenient location. In the embodiment described herein, it has been found convenient to place this reference point 56 near one corner, as shown in FIG. 5.

Means are provided to alternately energize the current sources 38 and 42 so that the potential at a point between the upper and lower edges and the potential between the left and right edges of major surface 18 as seen in FIG. 5 may be independently determined. The means for alternately energizing the first and second current sources 38 and 42 are represented schematically by a vertical control 55, a horizontal control 58, and a timing control 60. The vertical and horizontal controls 55 and 58 may alternately, on signal from timing control 60, provide a current to the base of a transistor so that a current will flow through the transistor on signal. Such a system is well known in the art and will not be further described herein. Timer 60 which energizes the vertical and horizontal control, respectively, through appropriate conductors 62 and 64, may be any convenient clock device with a pulsed output.

A probe 66 which forms a part of probe means 22 may be put in contact with major surface 18 so that the vertical and horizontal potentials at a point 68 on major surface 18 may be measured relative to a reference potential taken at point 56. This is accomplished by providing the potentials obtained by the probe 66 and that a reference point 50 to a differential amplifier 70 so that the algebraic difference between the reference potential and the potential obtained at point 68 is obtained. It should be noted that the vertical and horizontal potentials obtained at point 68 are done in two steps. That is, the generally vertical potential between the point 68 and the reference point 56 is first obtained. Then the generally horizontal potential between the point 68 and the reference point 56 is obtained; thus two separate potentials are obtained on each measurement sequence.

Probe means 22 consists of an electrical lead 63 connecting control means 20 with a stylus 65 which has affixed at its extreme end the probe 66. Probe 66 is in electrical contact with lead 63. Probe 66 is preferably made of a highly conductive plastic or elastomer. It has been found that probe 66, which may be made of any other conductive material, should be softer than the material the conducting surface 18 is made of, so that surface 18 is not abraded away or impacted by contact with probe 66. As indicated above, the preferred embodiment uses a nylon mesh where the nylon yarns comprising the warp and weft are each coated with a conductive plastic material, thus the selection of the material for probe 66 is dependent on the hardness of the coating material.

In the case where a generally uniform electric field is used, the following technique may be used to align the positions determined by the device with the positions actually displayed on the underlying display device such as the cathode-ray tube.

The difference in voltage between the reference point and the potentials obtained by the probe or stylus point 66 are then applied to two scaling and offsetting amplifiers 72 and 74. These amplifiers serve to make adjustments for scale and offset of the obtained signal. That is, when the mesh or electrical conductor 16 is first put into use, there may be some adjustment necessary to the outputted signal to ensure that the point 68 located at the probe point 66 and the corresponding point on the video display device coincide. This, of course, is apparent when the signal obtained is fed to a digital computer 13 to be returned as the corresponding visual signal on the cathode-ray tube 12.

In particular, the scale adjustment allows the size of the pointing space to be adjusted to the same size as the display space while the offset adjustments allow the pointing space to be aligned over the display space. The outputs of the scaling and offsetting amplifiers 72 and 74 are applied to a code conversion circuitry 76 which, in conjunction with timer 60 through a signal received in a conductor 78 converts the voltages received from the scaling and offsetting amplifiers 72 and 74 into the desired signal having some intelligence. This signal may be in the form of a pulse, a steady voltage, or the like. The signal, of course, represents the coordinates of the position pointed to and which may then be transmitted to some other device such as computer 14 through a conductor 80.

Figure 6:
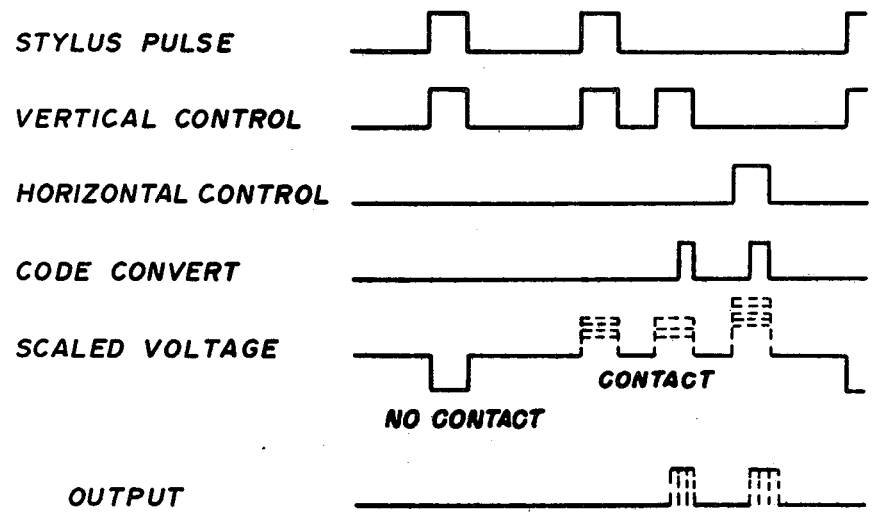
FIG. 6 schematically represents the timing sequence of the circuitry disclosed in FIG. 5.

It should be apparent that it is necessary for the system to be able to determine whether the probe 66 is in contact with major surface 18 or not. This is accomplished in part through timer 60 and in part through the vertical control circuit 55. In particular, the timer 60 provides a current to the probe 66 by means of a constant current source 82. At the same time, timer 60 pulses the vertical control circuit 55. Thus, a pluse is generated in the stylus and a pulse is generated in the vertical control. The resulting voltage at amplifier 72 is low if there is no contact and high if there is contact. This is represented in the schematic diagram in FIG. 6. This results in the fact that the scaled output from amplifier 72 is negative with no contact, thus indicating to the code conversion circuitry 76 that the stylus is not in contact. This test sequence is repeated and output codes are not generated, unless a specific application requires a code for no contact, until contact by probe 66 is made with surface 18. If the probe test pulse and the vertical control pulse indicate contact (the scaled voltage is high), the test pulse in the stylus is turned off and only the vertical control pulse is re-energized. At this time, the potential on the vertical axis is determined through the differential amplifier 70 and the scaling and offsetting amplifier 72 providing a pulse to the code conversion circuit 76.

It should be noted that timer 60, when pulsing the vertical control circuit 55, also provides a signal to the code conversion circuit 76 by conductor 78 so that the parallel outputs of amplifier 70 provided to the scaling and offsetting amplifiers 72 and 74 are respectively selected for the resultant vertical signal and the horizontal signal. For convenience's sake, the vertical signal may be represented as emanating from scaling and offsetting amplifier 72 while the horizontal signal may be represented as emanating from the scaling and offsetting amplifier 74. Thus, with the vertical control energized, the code conversion circuit converts the signal received from scaling and offsetting amplifier 72 into a signal of the form desired for transmission to conductor 80. Once the vertical coordinate has been determined, the timer 60 pulses the horizontal energizing circuit 58 and the same equence is followed through the scaling and offsetting amplifier 74 with the horizontal coordinate being obtained for transmission to conductor 80 in the proper form.

In the case where essentially non-uniform electric fields are used in the electrical conducting member 16, a mapping technique may be used to account for the correspondence between the displayed position and the measured generally horizontal and vertical probe potentials. In this non-uniform case the scaling and offset amplifiers are not required. In order to calibrate such a system, the calibration operator will cause to be displayed on the display device a set of points having known coordinates. By suitable selection means the code conversion circuitry is placed in calibration mode and by simultaneous coordination of the probe and a programming key, the coordinates at the points displayed are mapped with the corresponding probed potentials. In the run mode, the probed potentials are converted into the coordinates by interpolation of the developed calibration map. These conversion and interpolation procedures, which are well known in the art, are useful in overcoming inherent distortion found in cathode-ray devices and further permit the generation of coordinates in any system, e.g., Cartesian, polar, Smith chart, etc.

As can be seen, if probe 66 is moved across the face of major surface 18, a sequence of coordinates may thus be obtained for use as may be necessary, for instance, when "drawing." On the other hand, if the probe 66 is positioned at various points on the major surface 18, the location of various points may be determined, for instance, when "selecting." It should be understood that the computer 13 may, through various commands, utilize these various signals for various purposes. The signals may be transmitted back to a cathode-ray tube such as cathode-ray tube 12 to obtain a "picture" on the surface of the tube. On the other hand, intelligence may be supplied to the surface of cathode-ray tube 12 so that various options may be selected by picking a point on the surface of the cathode-ray tube with the probe, thus "answering a question."

Operation

While the best mode of carrying out this invention should be apparent to those skilled in the art, from a description set forth above, a brief resume of the operation of this system will be repeated herein for clarity purposes. Referring now to FIG. 1, the probe 66 is positioned on the major surface 18 with the system actuated. The probe 66 then measures the potential on the surface of major surface 18 between the reference point 56 and the probe 66 in two coordinates. In the embodiment illustrated, these coordinates are generally normal one to the other; however, non-linear and non-orthogonal coordinate systems may be utilized.

Non-linear and non-orthogonal coordinate systems generally would normally require the use of some computerized system to translate the coordinate systems into a more workable form such as a rectangular or polar coordinate system. In the system utilized, a substantially rectangular coordinate system is obtained by the use of a generally rectangular electrical conducting member 16 with the injection points spaced relatively evenly about two sides thereof. However, when electrical conducting member 16 is used in conjunction with a cathode-ray tube, it would normally take on the shape of the display surface. The coordinates are obtained by the probe 66 by measuring the voltage on the two axes and comparing that voltage to a reference voltage taken from a particular point on the surface of the electrical conducting member 16. By comparison, a signal representing the coordinate may then be provided to appropriate equipment for use as the case requires.

It should be noted that, while in the preferred embodiment described herein, the electrical conducting member 16 has been described in the form of a fine mesh screen 24 made of nylon material with a conductive outer coating, which is particularly useful in conjunction with a cathode-ray tube. The fine mesh, being flexible and somewhat formable, is readily molded to the surface of a display tube so that it eliminates Newton rings or Moire patterns. Furthermore, by dyeing the material black, the mesh serves the double purpose of an anti-glare screen. The electronics associated with the conducting member is such that the requirement for a uniform field and a rectangular member is to all intents eliminated. Thus the fine mesh screen can take on the same shape of the display device. It should be understood that frame 26 is wide enough to resist bending in the plane of the mesh but sufficiently flexible so that surface 18 is in contact with the display device. The assembly can be affixed to the display device by the CRT bezel or by double-sided tape.

Other electrical conducting members are also envisioned but not illustrated. For example, electrical conducting member 16 could be made of a metallic screen material. As has also been noted, it is possible to construct a coordinate sensing device in accordance with the teachings of this invention with a single injection point and a single current sink forming the first electric field, and a second injection point and current sink forming a second electric field, just so long as the position of the equipotential lines of each field intersect uniquely somewhere within the useful space on the surface of the electrical conducting member.

Other aspects, objects, and advantages of this invention can be obtained from a study of the drawings, the disclosure, and the appended claims.

I claim:
1. A coordinate sensing device comprising:
   a fine meshed fabric screen having electrical conductive properties and defining a major surface;
   first current source means for selectively establishing a first electrical current between a first injection point and first sink point on said major surface, said first injection and sink points defining a first electrical field across the said major surface;
   second current source means for selectively establishing a second electrical current between a second injectionand a second sink point on said major surface, said second injection point and sink points defining a second electric field across the said major surface, the two electric fields related so that the position of the equipotential lines from each field intersect at unique points;

probe means for selectively sensing a first electrical potential on the first electric field at a physical point on the surface between the first injection and sink points and a second electrical potential on the second electric field at the same physical point on the surface between the second injection and sink points;

means for converting said sensed first or second potentials to an intelligent signal representing the coordinates of the physical point indicated in any chosen coordinate system.

2. The coordinate sensing device as set forth in claim 1 further including switching means for alternately energizing said first and second current source means.

3. The coordinate sensing device as set forth in claim 2 wherein said fine meshed fabric screen is generally rectangular with said first injection and sink points located respectively on first and second opposite sides thereof and said second injection and sink points located respectively on third and fourth opposite sides thereof; the first current means further including additional injection and sink points interconnected with said first current source for selectively establishing the first electrical current between said first and second opposite sides, said additional injection points spaced apart from said first injection point and said additional sink points spaced apart from said first sink point.

4. The coordinate sensing device of claim 3 wherein the second current means further includes additional injection and sink points on the third and fourth opposite sides of the rectangular fine meshed fabric screen for selectively establishing the second electrical current between the third and fourth side.

5. The current sensing device of claim 4 wherein each of the injection points on the third side are separated one from another by a distance D while the end injection points on said third side are spaced apart from the first and second sides a distance C where D=2C.

6. The current sensing device of claim 3 wherein each of the injection points on the first side are separated one from another by a distance A while the end injection points on said first side are spaced apart from the third and fourth sides respectively a distance B where A=2B.

7. The coordinate sensing device of claim 1 wherein the converting means includes reference means for determining an electrical reference potential at a fixed reference point on the major surface of the fine meshed fabric screen and means for determining the algebraic difference between the electrical reference potential and the first or second sensed electrical potential.

8. The coordinate sensing device of claim 7 wherein the converting means further includes first means for varying the determined algebraic difference.

9. The coordinate sensing device of claim 8 wherein the converting means includes second means for varying the determined algebraic difference, said second means in parallel with said first means.

10. The coordinate sensing device of claim 9 wherein a switching means further includes timing means for selecting the output of said first or said second varying means corresponding with said first or second current means.

11. The coordinate sensing device of claim 1 wherein at least some of the warp and woof fibers of the meshed fabric are of a nylon material having incorporated therewith an electrically conducting material.

12. The coordinate sensing device of claim 11 wherein the meshed fabric is dyed with a non-reflective color.

13. The current sensing device of claim 1 wherein the warp and weft fibers of the meshed fabric screen are of nylon, at least some of the fibers having an outer coating of an electrical conducting material.

14. The current sensing device of claim 13 wherein the meshed material is transparent.

15. A coordinate sensing device comprising:
an electrical conducting member formed of fine mesh material defining a major surface;

first current source means for selectively establishing a first electrical current between at least one injection point and at least one sink point on said major surface, said injection and sink points defining a first electrical field across the said major surface;

second current source means for selectively establishing a second electrical current between at least one second injection point and at least one second sink point on said major surface, said second injection and sink points defining a second electric field across the said major surface, the two electrical fields related so that the position of the equipotential lines from each field intersect at unique points;

probe means for selectively sensing a first electrical potential on the first electrical field at a physical point on the surface and a second electrical potential on the second field at the same physical point;

means for converting said sensed first or second potentials to an intelligent signal representing the coordinates of the physical point indicated in any chosen coordinate system.

16. The coordinate sensing device of claim 15 further including switching means for alternately energizing said first and second current source means.

17. A coordinate sensing device in combination with a video display device comprising:
a fine meshed fabric screen having electrical conductive properties and defining a major surface, said fine meshed fabric screen fixable to the picture-generating surface of the video display device;

first current source means for selectivity establishing a first electrical current between a first injection point and a first sink point on said major surface, said first injection and sink points defining a first electrical field across said major surface;

second current source means for selectivity establishing a second electrical current between a second injection point and a second sink point on said major surface, said second injection and sink points defining a second electrical field, the two electric fields related so that the position of the equipotential lines from each field intersect at unique points;

switching means for alternately energizing said first and second current source means;

probe means for selectively sensing a first electrical potential on the first electrical field at a physical point on the major surface and a second electrical potential on the second electrical field at the same physical point;

means for converting said sensed first or second potential to an intelligent signal;

computer means for imposing the intelligent signal on the surface of the video display device at the point selected by the probe means.

18. The combination as set forth in claim 17 wherein the converting means includes reference means for determining an electrical reference potential at a fixed reference point on the major surface of the fine meshed fabric screen; and means for determining the algebraic difference between the electrical reference potential and the first or second sensed electrical potential.

19. The combination set forth in claim 17 wherein the converting means includes first means for varying the determined algebraic difference.

20. The combination set forth in claim 19 wherein the converting means includes second means for varying the determined algebraic difference, said second means in parallel to said first means for determining the algebraic difference.

21. The combination as set forth in claim 19 wherein the switching means further includes timing means for selecting the output of said first or second varying means corresponding with said first or second current means.

22. A relatively flexibe electrical conducting member for a curved video display screen comprising:
- a thin portable frame of a flexible material;
- a microweave mesh of black filaments stretched across the inner surface of said frame, said frame having electrical conductive properties, at least some of said black filaments capable of conducting electrical current, and affixed to said frame;
- said frame sufficiently wide enough that it resists bending in all directions in the plane of the mesh but being flexible in all directions transverse thereto so that said frame and stretched mesh will conform to the curvature of a video display device to which the frame is attached;
- means for attaching said frame to a terminal display scope so that said mesh conforms to contact said scope over the surface thereof.

* * * * *

UNITED STATES PATENT AND TRADEMARK OFFICE
CERTIFICATE OF CORRECTION

PATENT NO. : 4,442,317
DATED : April 10, 1984
INVENTOR(S) : Louis H. M. Jandrell It is certified that error appears in the above-identified patent and that said Letters Patent is hereby corrected as shown below:

In column 4, line 50, correct the spelling of "schemattically" to "schematically".

In column 8 (Claim 1), correct lines 65 and 66 to read as follows:

"injection point and a second sink point on said major surface, said second injection and sink points . . . "

Signed and Sealed this

Twenty-eighth Day of May 1985

[SEAL]

Attest:

DONALD J. QUIGG

*Attesting Officer*     *Acting Commissioner of Patents and Trademarks*